United States Patent
Sen et al.

(10) Patent No.: US 11,074,419 B1
(45) Date of Patent: Jul. 27, 2021

(54) SYSTEMS AND METHODS FOR PROVIDING ONLINE CONTENT IN BRAILLE

(71) Applicant: Morgan Stanley Services Group Inc., New York, NY (US)

(72) Inventors: Devanshu Sen, Rajasthan (IN); Sumanth Sampath, Maharshtra (IN); Pravin Patil, Maharashtra (IN); Mohit Pal, Maharashtra (IN); Kranthi Darapu, Jersey City, NJ (US); Merav Pepere, Brooklyn, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/921,622

(22) Filed: Jul. 6, 2020

(51) Int. Cl.
| | |
|---|---|
| G09B 21/00 | (2006.01) |
| G06F 40/55 | (2020.01) |
| G06F 40/284 | (2020.01) |
| G06F 40/205 | (2020.01) |
| G06N 5/00 | (2006.01) |
| G06F 16/95 | (2019.01) |
| G06N 5/02 | (2006.01) |
| G06Q 50/10 | (2012.01) |
| G06Q 20/12 | (2012.01) |

(52) U.S. Cl.
CPC ............. G06F 40/55 (2020.01); G06F 16/95 (2019.01); G06F 40/205 (2020.01); G06F 40/284 (2020.01); G06N 5/00 (2013.01); G06N 5/027 (2013.01); G09B 21/00 (2013.01); G06Q 20/123 (2013.01); G06Q 50/10 (2013.01)

(58) Field of Classification Search
None
See application file for complete search history.

(56) References Cited

U.S. PATENT DOCUMENTS

| | | | |
|---|---|---|---|
| 6,738,951 B1 | 5/2004 | Weiss et al. | |
| 9,747,813 B2 | 8/2017 | Schramm et al. | |
| 2002/0138521 A1 | 9/2002 | Sharp | |
| 2008/0153072 A1* | 6/2008 | Kurashina | B41J 3/32 434/114 |
| 2008/0303645 A1 | 12/2008 | Seymour et al. | |
| 2014/0377721 A1* | 12/2014 | Reid | G09B 21/005 434/114 |
| 2017/0084201 A1 | 3/2017 | Dooley | |
| 2018/0218726 A1 | 8/2018 | Arumugam et al. | |
| 2019/0066536 A1 | 2/2019 | Dooley | |
| 2019/0122579 A1* | 4/2019 | Blakey | G09B 21/005 |

FOREIGN PATENT DOCUMENTS

CN 105630770 A * 6/2016

* cited by examiner

*Primary Examiner* — Richa Mishra
(74) *Attorney, Agent, or Firm* — Pearl Cohen Zedek Latzer Baratz LLP

(57) ABSTRACT

A method and system for providing online content in braille is provided. The method and system can allow for any online content to be converted from text into electronic braille by tokenizing the online content and determining the electronic braille form the tokenized online content based on a set of rules.

16 Claims, 4 Drawing Sheets

Braille Translator

Library                Translator                Rules

Select a Grade
[Grade 2 ▼]

Please select a Standard
[Standard ▼]

Filter with rule type
[ALL ▼]

[Get Rules]

Rules:

| Key | Value | Rule Type |
|---|---|---|
| ABOUT | AB | CONTAINS |
| ABOVE | ABV | WORD |
| ACCORDING | AC | PREFIX |

180

FIG. 1A

SYSTEMS AND METHODS FOR PROVIDING ONLINE CONTENT IN BRAILLE

FIELD OF THE INVENTION

The invention relates generally to providing online content into braille typically used by visually impaired individuals. In particular, the online content typically displayed via a screen can be provided to visually impaired individuals by translating the online content into electronic braille that is braille printer or refreshable braille display ready.

BACKGROUND OF THE INVENTION

Currently, publishers publish hundreds of thousands of books per year (e.g., on the order of 600,000 books per year), however, only approximately 10% of those books are made available in braille. Additionally, although a large percentage of the books are available online, online content can be challenging for visually impaired individuals to access due to the complexity of converting it into braille.

Current computing systems do exist to convert text into braille. However, these systems typically require that a user input the text to be converted to a computer system (e.g., by manually typing or copy and pasting), the computer system converting the text into braille (e.g., an electronic representation of the braille), and the computer system outputting the electronic braille, for example, to a braille printer or to a refreshable braille display.

Other current computing systems that convert text into braille can require a known format for the online content, thus limiting the type of online content visually impaired individuals have access too.

SUMMARY OF THE INVENTION

One advantage of the invention is an ability to provide a variety of online content in braille. Another advantage of the invention is an ability of online publishers to convert books and/or content into braille without having to input the text via copying or manual input. Another advantage of the invention is an improved accuracy due to, for example, configurable rule set for the conversion of English to braille. Another advantage of this invention is the ability to output the content in multiple formats for easy distribution to the visually impaired.

In one aspect, the invention involves a method of providing online content in braille. The method involves receiving, by a computing device, from a user input device a request for online content in braille. The method also involves retrieving, by the computing device, the online content. The method also involves determining, by the computing device, a plurality of tokens from the online content, wherein each of the plurality of tokens includes one word. The method also involves determining, by the computing device, electronic braille from the plurality of tokens based on a set of rules. The method also involves transmitting, by the computing device, the electronic braille to a second computing device or a printer for printing.

In some embodiments, the online content is a web page, a PDF, or any text available in an online format. In some embodiments, the method involves determining the plurality of tokens comprises parsing the online content based on spaces, periods, dots, semicolon, commas, or any combination thereof in the online content. In some embodiments, the method involves determining electronic braille comprises processing the plurality of tokens in order that is equivalent to an order of the words in the sentence.

In some embodiments, the method also involves determining electronic braille from the plurality of tokens based on a set of rules further comprises electing a rule of the set of rules to apply to a particular token of the plurality of tokens based on whether the token is a whole word, includes a prefix, or includes a postfix.

In some embodiments, the set of rules is based on a braille type. In some embodiments, the set of rules is input by a user. In some embodiments, the second computing device is a refreshable braille display. In some embodiments, for online content that is in a tabular form, the method also involves identifying the rows and columns of the tabular format and applying a rule from the set of rules that adds spaces and dotted lines to the braille to represent the columns and rows.

In another aspect, the invention includes a computer program product including instructions which when the program is executed cause the computer to receive from a user input device a request for online content in braille, retrieve the online content, determine a plurality of tokens from the online content, wherein each of the plurality of tokens includes one word, determine electronic braille from the plurality of tokens based on a set of rules, and transmit the electronic braille to a second computing device or a printer for printing.

In another aspect, the invention includes a system for providing online content in braille, the system including a word tokenizer that determines a plurality of tokens from received online content, wherein each of the plurality of tokens includes one word. The system also includes a rule engine that includes a rule database that includes a plurality of rules, and a rule orchestrator that determines electronic braille from the plurality of tokens based on a set of rules, wherein the rule engine transmits the electronic braille to a second computing device or a printer for printing.

In some embodiments, the rule orchestrator selects a rule of the set of rules to apply to a particular token of the plurality of tokens based on whether the token is a whole word, includes a prefix, or includes a postfix.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 1A is a diagram of a graphical user interface for providing one or more inputs for providing online content in braille, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

Figure 1:
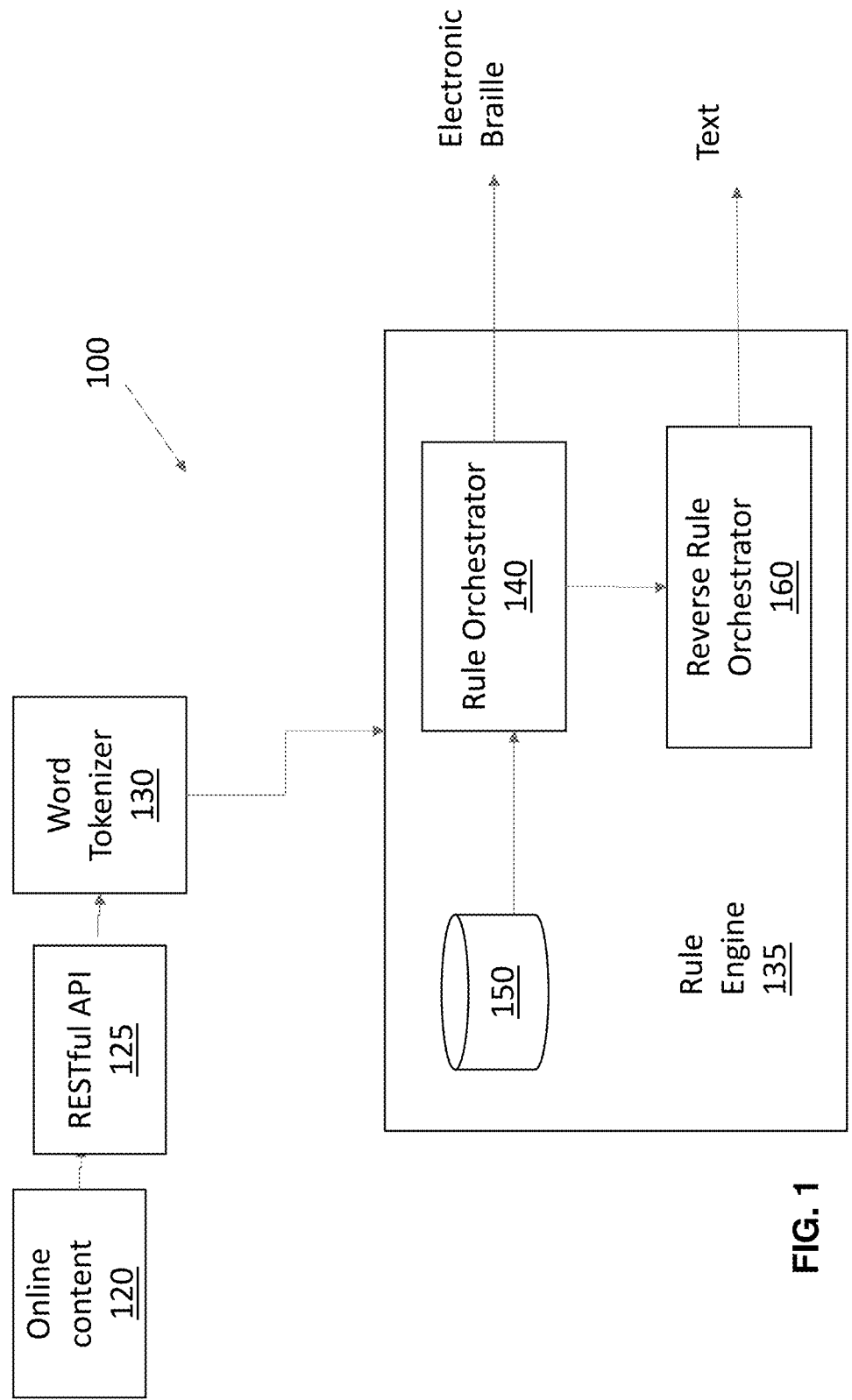
FIG. 1 is a block diagram of a system architecture for providing online content in braille, according to some embodiments of the invention.

FIG. 1 is a block diagram of a system 100 for providing online content in braille, according to some embodiments of the invention. The system 100 includes a word tokenizer 130 and a rule engine 135. The rule engine includes a rule database 150, a rule orchestrator 140 and a reverse rule orchestrator 160.

The RESTful API 125 can be in communication with online content 120. The RESTful API 125 can receive online content over a wired or wireless public or private network (e.g., via the Internet, WWW, or any network that can provide online content). The online content can be an html page, a PDF file, a word document, text document and/or any other document type from which text can be extracted. The RESTful API 125 can extract text form the online content. For example, if the online content is HTML, then the RESTful API can extract plain text from the HTML.

The word tokenizer 130 can be in communication with the RESTful API 125 and the rule engine 135. The word tokenizer 130 can create one or more tokens from the online content. The word tokenizer 130 can parse the online content into individual words to create one token for each word. The online content can be parsed based on spaces, periods, dots, semicolons, and/or commas. For example, as the online content is input to the word tokenizer 130, sequential sets of alphabetic characters can be grouped as one word, until a special character (e.g., space, period, dot, semicolon, or comma) is encountered. Once the special character is encountered, the alphabetic characters can be input to a first token. Upon encountering the next alphabetic character, subsequent alphabetic characters can be grouped as one word until the next special character is encountered, and input to a second token. And so forth until all words in the online content are input to tokens.

The word tokenizer 130 can transmit the one or more tokens to the rule engine 135. The one or more tokens can be received by the rule engine 135 at the rule orchestrator 140. The rule orchestrator 140 can analyze the one or more tokens to determine which rules in the rule database 150 apply to the one or more tokens. The rule orchestrator 140 can retrieve the rules that apply from the rule database 150 and apply the rules to the one or more tokens.

In some braille languages, repeated sequences of letters can be reduced to abbreviations. In some embodiments, a prefix, a postfix, or a word that contains repeated sequences of letters can be abbreviated. For example, many text words include the postfix "one." Instead of converting each letter "one" the postfix can be represented in braille by the letters "o."

The rule orchestrator 140 can analyze each word to determine if it includes a prefix, postfix, contains repeated sequences of letter and/or is a whole word to determine the one or more rules to apply.

The rule orchestrator 140 can analyze a language type of the one or more tokens and determine a set of rules based on the language type. For example, if the one or more tokens are English, then the set of rules that converts English text to English braille are selected. If the one or more tokens are in Hebrew, then the set of rules that converts Hebrew text to Hebrew braille are selected.

The one or more rules selected can be based on whether the braille is Grade 1, Grade 2, or Grade 3 braille. Grade 1 braille can be a translation that is performed character by character. For example, every character in English language can have a braille equivalent. Grade 2 and/or Grade 3 can be conversion into braille on a word by word basis. There can be various rules of contraction. For example, if "one" appears towards the end of the word then replace it with "o" only if it is not being preceded by "o". In another example, if "according" appears at the beginning of the word then replace it with "acc" etc.

The one or more rules selected can be based on format of the online content.

The one or more rules can be configurable by a user (e.g., via a user interface). FIG. 1A is a diagram of a graphical user interface for providing one or more inputs for providing online content in braille, according to some embodiments of the invention.

Turning back to FIG. 1, in some embodiments, for online content that is a grid (or table), the one or more rules applied to the token removes the content from the grid, and reformats to appear in tabular format under braille rules. In various embodiments, tables, grids and/or lists are converted based on a format from well known authorities (e.g., braille authority). In some embodiments, table structures are accepted as input in the online content. Table 1 shown below is an example of a tax document in tabular format intended for a visually impaired client converted into braille.

,below table contains #ad rows and #c columns 4

TABLE 1

7777777777777777777777777777777777777777777777
  ,key to ,row ,headings
    ,row ,headings
_4 ,,tod ,,total ,,ordinary ,,dividends
_4 ,,qd ,,qualified ,,dividends
_4 ,,tcgd ,,total ,,capital ,,gain
,,distributions
_4 ,,usg ,,unrecap ;4,,sec4 #abej ,,gain
_4 ,,cg ,,collectibles "<#bh.0"> ,,gain
_4 ,,ndd ,,non-,,dividend ,,distribution
_4 ,,fitw ,,federal ,,income ,,tax
,,withheld
_4 #aii,a ,,div ,,section #aii,a
,,dividends
_4 ,,ie ,,investment ,,expenses
_4 ,,ftp ,,foreign ,,tax ,,paid
  #h
_4 ,,cld ,,cash ,,liquidation
,,distributions
_4 ,,ncld ,,non-,,cash ,,liquidation
,,distributions
_4 ,,eid ,,exempt-,,interest ,,dividends
_4 ,,spabid ,,specified ,,private
,,activity ,,bond ,,interest ,,dividends TABLE 1-continued

| | | |
|---|---|---|
| ,,irs ,,box | ,desc | ,amount |
| #aa | ,,tod | @s#chj4ig |
| #ab | ,,qd | @s#chj4hd |
| #ba | ,,tcgd | @s#j |
| #bb | ,,usg | @s#j |
| #bd | ,,cg | @s#j |
| #c | ,,ndd | @s#ad4fh |
| #d | ,,fitw | @s#j4jb |
| #e | #aii,a ,,div | @s#j |
| #f | ,,ie | @s#j |
| #g | ,,ftp | @s#j4jh |
| #i | ,,cld | @s#j |
| #aj | ,,ncld | @s#j |
| #aa | ,,eid | @s#j |
| #ab | ,,spabid | @s#j |
| ggggggggggggggggggggggggggggggggggggggggg #i | | |

The rule orchestrator 140 can applying the one or more rules to cause the one or more tokens to convert to an electronic braille format. The electronic braille format can be a Unicode format, a braille equivalent or any combination thereof. The electronic braille can be an electronic representation of the braille characters. The electronic braille can be output to a braille printer, a refreshable braille display and/or a second computing device. In some embodiments, the electronic braille is generated at a first computing device, and transmitted to a second computing device, and then printed or output to a refreshable braille display. For example, a visually impaired individual can request an online book via voice commands on a computer. The online book retailer can convert the book via the present invention into electronic braille. The electronic braille can be transmitted from the online book retailer to the visually impaired individual who then can print the book.

The rule orchestrator 140 can be in communication with the reverse rule orchestrator 160. The rule orchestrator 140 can output the one or more rules used for converting the online content into braille. The reverse rule orchestrator 160 can convert the electronic braille into text based on the one or more rules used by and received from the rule orchestrator 140. Translating the electronic braille into text can allow the electronic braille to be proofread. In some embodiments, the electronic braille that does not have an equivalent in a particular language (e.g., English) can be can be translated into the particular language.

In various embodiments, each of the components in the system of FIG. 1 are implemented on separate computing devices, the same computing device, or any combination of computing devices thereof. The communication between the elements in FIG. 1 can be wired or wireless. The online content can be received from one or more computing devices and can be received over the internet. The output of the system of FIG. 1 can be transmitted by wire or wirelessly via the internet and/or private networks.

Figure 2:
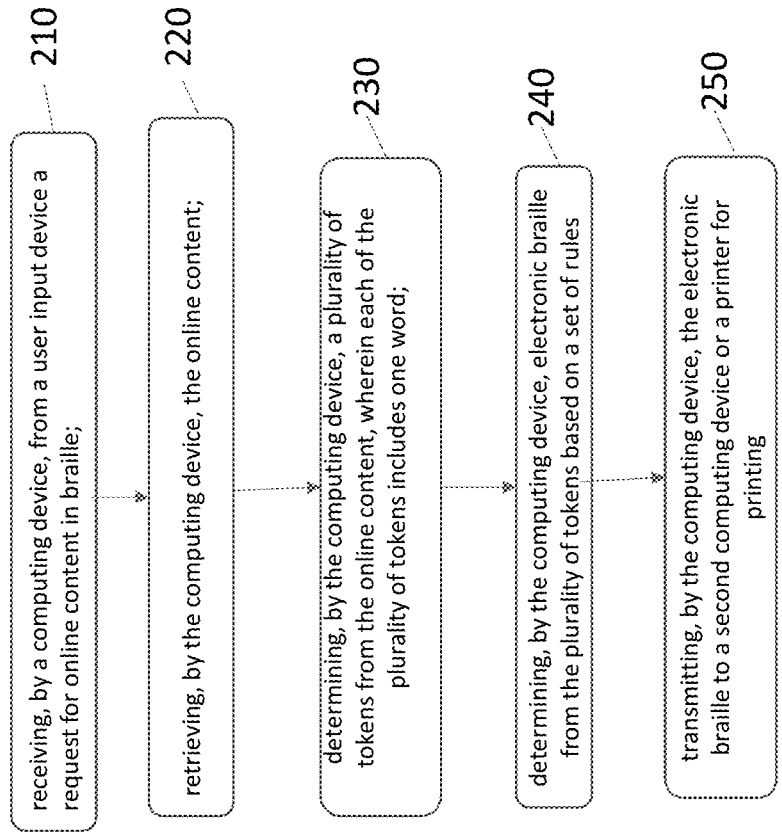
FIG. 2 is a flow chart of a method for providing online content in braille, according to some embodiments of the invention.

FIG. 2 is a flow chart of a method for providing online content in braille. The method includes receiving, by a computing system (e.g., the system of FIG. 1 as described above), from a user input device a request for online content in braille (Step 210). In some embodiments, the request includes a request for a .PDF, web page, and/or an electronically stored document.

The method also includes retrieving, by the computing system, the online content (Step 220). In some embodiments, the request for online content in braille includes the online content. For example, the online content can be transmitted directly from the internet without the computing device retrieving it.

The method also involves determining a plurality of tokens (e.g., via the word tokenizer 130, as described above in FIG. 1) from the online content, wherein each of the plurality of tokens includes one word (Step 230). For example, assume an online content of a book, having a title "Gone With the Wind." In this example, four tokens can be created, token 1=Gone; token 2=With; token 3=the; and token 4=Wind.

The method also involves determining, by the computing device (e.g., via the rule orchestrator 140 and rule repository 150, as described above in FIG. 1), electronic braille from the plurality of tokens based on a set of rules (Step 240). The electronic braille can be determined as described above with respect to FIG. 1. Continuing with the above example, each token, token 1, token 2, token 3 and token 4 can be converted such that the electronic braille generated and put together in a braille sentence represents the words "Gone With the Wind."

The method also involves transmitting, by the computing device, the electronic braille to a second computing device or a printer for printing (Step 250).

Figure 3:
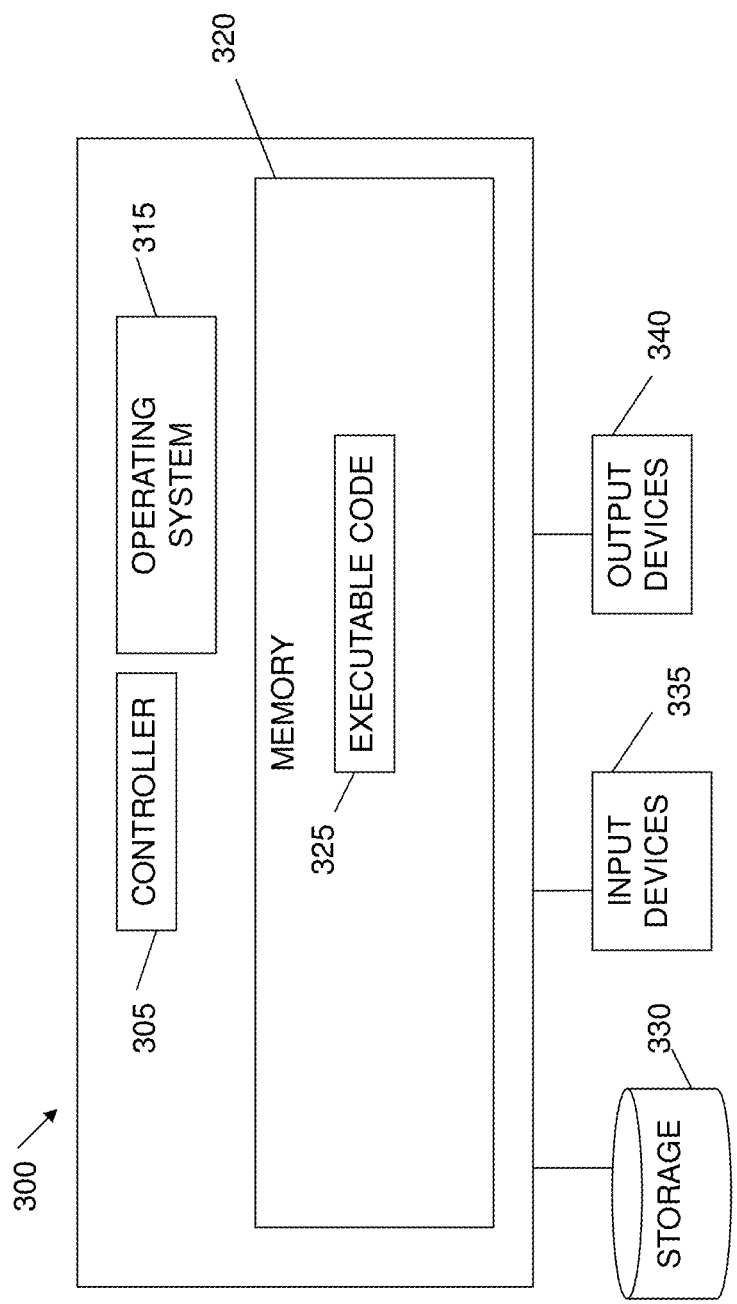
FIG. 3 is a block diagram of a computing device which can be used with embodiments of the invention.

FIG. 3 shows a block diagram of a computing device 300 which can be used with embodiments of the invention. Computing device 300 can include a controller or processor 305 that can be or include, for example, one or more central processing unit processor(s) (CPU), one or more Graphics Processing Unit(s) (GPU or GPGPU), a chip or any suitable computing or computational device, an operating system 315, a memory 320, a storage 330, input devices 335 and output devices 340.

Operating system 315 can be or can include any code segment designed and/or configured to perform tasks involving coordination, scheduling, arbitration, supervising, controlling or otherwise managing operation of computing device 400, for example, scheduling execution of programs. Memory 320 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 320 can be or can include a plurality of, possibly different memory units. Memory 320 can store for example, instructions to carry out a method (e.g. code 325), and/or data such as user responses, interruptions, etc.

Executable code 325 can be any executable code, e.g., an application, a program, a process, task or script. Executable code 325 can be executed by controller 305 possibly under control of operating system 315. For example, executable code 325 can when executed cause masking of personally identifiable information (PII), according to embodiments of the invention. In some embodiments, more than one computing device 300 or components of device 300 can be used for multiple functions described herein. For the various modules and functions described herein, one or more computing devices 300 or components of computing device 300 can be used. Devices that include components similar or different to those included in computing device 300 can be used, and can be connected to a network and used as a system. One or more processor(s) 305 can be configured to carry out embodiments of the invention by for example executing software or code. Storage 330 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 330 and can be loaded from storage 330 into a memory 320 where it can be processed by controller 305. In some embodiments, some of the components shown in FIG. 3 can be omitted.

Input devices 335 can be or can include for example a mouse, a keyboard, a touch screen or pad or any suitable input device. It will be recognized that any suitable number of input devices can be operatively connected to computing device 300 as shown by block 335. Output devices 340 can include one or more displays, speakers and/or any other suitable output devices. It will be recognized that any suitable number of output devices can be operatively connected to computing device 300 as shown by block 340. Any applicable input/output (I/O) devices can be connected to computing device 300, for example, a wired or wireless network interface card (NIC), a modem, printer or facsimile machine, a universal serial bus (USB) device or external hard drive can be included in input devices 335 and/or output devices 340.

Embodiments of the invention can include one or more article(s) (e.g. memory 320 or storage 330) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of providing online content in braille, the method comprising:
   receiving, by a computing device, from a user input device a request for online content in braille;
   retrieving, by the computing device, the online content;
   determining, by the computing device, a plurality of tokens from the online content, wherein each of the plurality of tokens includes one word;
   determining, by the computing device, electronic braille from the plurality of tokens based on a set of rules, by selecting a rule of the set of rules to apply to a particular token of the plurality of tokens based on whether the token is a whole word, includes a prefix, or includes a postfix, wherein the set of rules is based on a braille type, wherein the set of rules includes at least one prefix rule, at least one postfix rule and at least one contains rule, where each of the at least one prefix rule, the at least one postfix rule and the at least one contains rule when applied to the particular token causes the particular token to be converted into electronic braille by converting only a subset of letters in the word in the particular token; and
   transmitting, by the computing device, the electronic braille to a second computing device or a printer for printing.

2. The method of claim 1 wherein the online content is in any type of online content that text is extractable from.

3. The method of claim 1 wherein determining the plurality of tokens further comprises parsing the online content based on spaces, periods, dots, semicolon, commas, or any combination thereof in the online content.

4. The method of claim 1 wherein determining electronic braille further comprises processing the plurality of tokens in order that is equivalent to an order of the words in the sentence.

5. The method of claim 1 wherein the set of rules is input by a user.

6. The method of claim 1 wherein the second computing device is a refreshable braille display.

7. The method of claim 1 wherein for online content that is in a tabular form, the method further comprises identifying the rows and columns of the tabular format and applying a rule from the set of rules that adds spaces and dotted lines to the braille to represent the columns and rows.

8. A non-transitory computer program product comprising instructions which, when the program is executed cause the computer to:
   receive from a user input device a request for online content in braille;
   retrieve the online content;
   determine a plurality of tokens from the online content, wherein each of the plurality of tokens includes one word;
   determine electronic braille from the plurality of tokens based on a set of rules, by selecting a rule of the set of rules to apply to a particular token of the plurality of tokens based on whether the token is a whole word, includes a prefix, or includes a postfix, wherein the set of rules is based on a braille type, wherein the set of rules includes at least one prefix rule, at least one postfix rule and at least one contains rule, where each of the at least one prefix rule, the at least one postfix rule and the at least one contains rule when applied to the particular token of the plurality of tokens causes the particular token to be converted into electronic braille by converting only a subset of letters in the word in the particular token; and transmit the electronic braille to a second computing device or a printer for printing.

9. The non-transitory computer program product of claim 8 wherein the online content is in any type of online content that text is extractable from.

10. The non-transitory computer program product of claim 8 wherein determining the plurality of tokens further comprises parsing the online content based on spaces, periods, dots, semicolon, commas, or any combination thereof in the online content.

11. The non-transitory computer program product of claim 8 wherein determining electronic braille further comprises processing the plurality of tokens in order that is equivalent to an order of the words in the sentence.

12. The non-transitory computer program product of claim 8 wherein the set of rules is input by a user.

13. The non-transitory computer program product product of claim 8 wherein the second computing device is a refreshable braille display.

14. The non-transitory computer program product of claim 8 wherein for online content that is in a tabular form, the method further comprises identifying the rows and columns of the tabular format and applying a rule from the set of rules that adds spaces and dotted lines to the braille to represent the columns and rows.

15. A system for providing online content in braille, the system comprising:
a word tokenizer that determines a plurality of tokens from received online content, wherein each of the plurality of tokens includes one word;
a rule engine that comprises:
a rule database that includes a plurality of rules, and
a rule orchestrator that determines electronic braille from the plurality of tokens based on a set of rules, by selecting a rule of the set of rules to apply to a particular token of the plurality of tokens based on whether the token is a whole word, includes a prefix, or includes a postfix, wherein the set of rules is based on a braille type, wherein the set of rules includes at least one prefix rule, at least one postfix rule and at least one contains rule, where each of the at least one prefix rule, the at least one postfix rule and the at least one contains rule when applied to the particular token causes the particular token to be converted into electronic braille by converting only a subset of letters in the word in the particular token; and
wherein the rule engine transmits the electronic braille to a second computing device or a printer for printing.

16. The system of claim 15 wherein the rule orchestrator selects a rule of the set of rules to apply to a particular token of the plurality of tokens based on whether the token is a whole word, includes a prefix, or includes a postfix.

* * * * *